United States Patent
Ideguchi et al.

(10) Patent No.: US 10,006,519 B2
(45) Date of Patent: Jun. 26, 2018

(54) TOOTHED BELT

(71) Applicant: Mitsuboshi Belting Ltd., Kobe-shi, Hyogo (JP)

(72) Inventors: Isao Ideguchi, Hyogo (JP); Hiroaki Ikegami, Hyogo (JP)

(73) Assignee: Mitsuboshi Belting Ltd., Kobe-shi, Hyogo (JP)

( * ) Notice: Subject to any disclaimer, the term of this patent is extended or adjusted under 35 U.S.C. 154(b) by 0 days. days.

(21) Appl. No.: 15/307,674

(22) PCT Filed: Apr. 27, 2015

(86) PCT No.: PCT/JP2015/062748
§ 371 (c)(1),
(2) Date: Oct. 28, 2016

(87) PCT Pub. No.: WO2015/166929
PCT Pub. Date: Nov. 5, 2015

(65) Prior Publication Data
US 2017/0051810 A1 Feb. 23, 2017

(30) Foreign Application Priority Data

Apr. 30, 2014 (JP) ................................. 2014-093930
Apr. 15, 2015 (JP) ................................. 2015-083109

(51) Int. Cl.
*F16G 1/28* (2006.01)
*F16G 5/20* (2006.01)
*F16G 1/08* (2006.01)

(52) U.S. Cl.
CPC ................ *F16G 1/28* (2013.01); *F16G 1/08* (2013.01)

(58) Field of Classification Search
CPC . F16G 1/28; F16G 1/10; C08L 15/005; C08L 21/00; C08K 5/09
(Continued)

(56) References Cited

U.S. PATENT DOCUMENTS 4,498,891 A * 2/1985 Mashimo ............... B29D 29/00
474/205
5,230,667 A * 7/1993 Nakajima ................ D02G 3/28
474/263

(Continued)

FOREIGN PATENT DOCUMENTS

CN 102844172 A 12/2012
CN 103290697 A 9/2013
(Continued)

OTHER PUBLICATIONS

Oct. 25, 2016—(JP) Decision of Refusal—App 2015-083109.
(Continued)

*Primary Examiner* — Henry Y Liu
(74) *Attorney, Agent, or Firm* — Banner & Witcoff, Ltd.

(57) ABSTRACT

The present invention relates to a toothed belt containing tooth parts that are disposed at predetermined intervals along a belt longitudinal direction, a cord, and a back side that has the cord embedded therein, in which the cord contains a Lang-twisted glass fiber, an adhesion treatment layer, and an overcoat treatment layer, the overcoat treatment layer is formed on a surface of the adhesion treatment layer, the back side is composed of a rubber composition, and the rubber composition contains from 5 parts by mass to 20 parts by mass of a plasticizer based on 100 parts by mass of a rubber component.

7 Claims, 3 Drawing Sheets

(58) Field of Classification Search
USPC .......................................................... 474/205
See application file for complete search history.

(56) References Cited

U.S. PATENT DOCUMENTS

| | | | | |
|---|---|---|---|---|
| 5,306,213 | A * | 4/1994 | Nakajima | B29D 29/08 |
| | | | | 474/205 |
| 7,435,198 | B2 * | 10/2008 | Tomobuchi | F16G 1/28 |
| | | | | 428/421 |
| 8,512,186 | B2 * | 8/2013 | Mitsutomi | F16G 1/28 |
| | | | | 474/205 |
| 8,911,863 | B2 | 12/2014 | Matsumoto et al. | |
| 9,709,129 | B2 | 7/2017 | Matsuda | |
| 2006/0063627 | A1 * | 3/2006 | Tomobuchi | F16G 1/28 |
| | | | | 474/205 |
| 2009/0032177 | A1 * | 2/2009 | Takahashi | B29D 29/10 |
| | | | | 156/137 |
| 2011/0118068 | A1 * | 5/2011 | Mitsutomi | F16G 1/10 |
| | | | | 474/205 |
| 2011/0124453 | A1 * | 5/2011 | Nakashima | F16G 1/10 |
| | | | | 474/139 |
| 2012/0309573 | A1 | 12/2012 | Well et al. | |
| 2013/0217528 | A1 | 8/2013 | Matsumoto et al. | |
| 2013/0337956 | A1 * | 12/2013 | Motozaki | F16G 1/04 |
| | | | | 474/205 |
| 2014/0206487 | A1 * | 7/2014 | Tomobuchi | C08K 3/00 |
| | | | | 474/205 |
| 2014/0243134 | A1 * | 8/2014 | Kucharczyk | F16G 1/16 |
| | | | | 474/261 |
| 2014/0323256 | A1 | 10/2014 | Yoshida | |
| 2015/0111677 | A1 * | 4/2015 | Nishiyama | F16G 1/10 |
| | | | | 474/264 |
| 2015/0148165 | A1 | 5/2015 | Matsuda | |
| 2015/0218357 | A1 * | 8/2015 | Feng | F16G 1/08 |
| | | | | 428/36.8 |
| 2016/0208889 | A1 * | 7/2016 | Yoshida | C08K 5/098 |

FOREIGN PATENT DOCUMENTS

| | | |
|---|---|---|
| JP | S58-118332 U | 8/1983 |
| JP | S59-015780 U | 5/1984 |
| JP | S62-007413 B2 | 2/1987 |
| JP | H07-027179 A | 1/1995 |
| JP | H09-124802 A | 5/1997 |
| JP | 2000-193040 A | 7/2000 |
| JP | 2004-116691 A | 4/2004 |
| JP | 2004-293754 A | 10/2004 |
| JP | 2009-102766 A | 5/2009 |
| WO | 2013/105191 A1 | 7/2013 |
| WO | 2014/006916 A1 | 1/2014 |

OTHER PUBLICATIONS

Aug. 23, 2016—(JP) Office Action—App 2015083109.
Jul. 28, 2015—International Search Report—Intl App PCT/JP2015/062748.
Oct. 3, 2017—(JP) Notification of Reasons for Refusal—App 2017-004433.
Dec. 13, 2017—(CN) Notification of First Office Action—App 201580023697.7.
Jan. 5, 2018—(EP) Extended Search Report—App 15786007.3.

* cited by examiner

[FIG. 1]
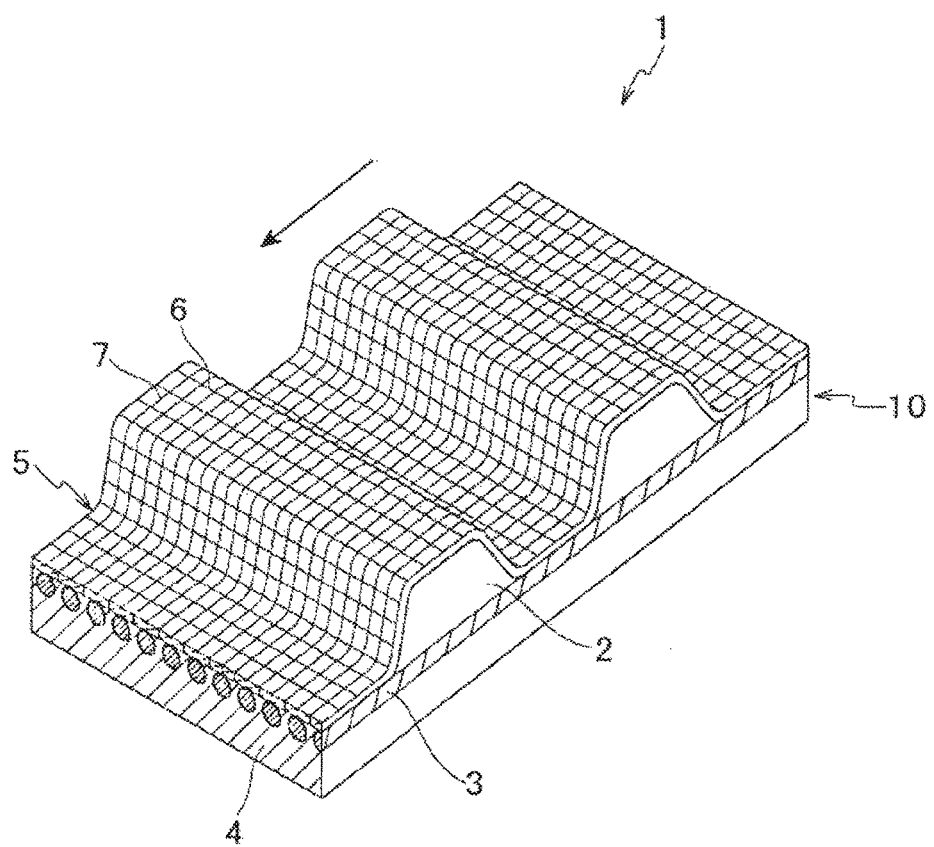

[FIG. 2]
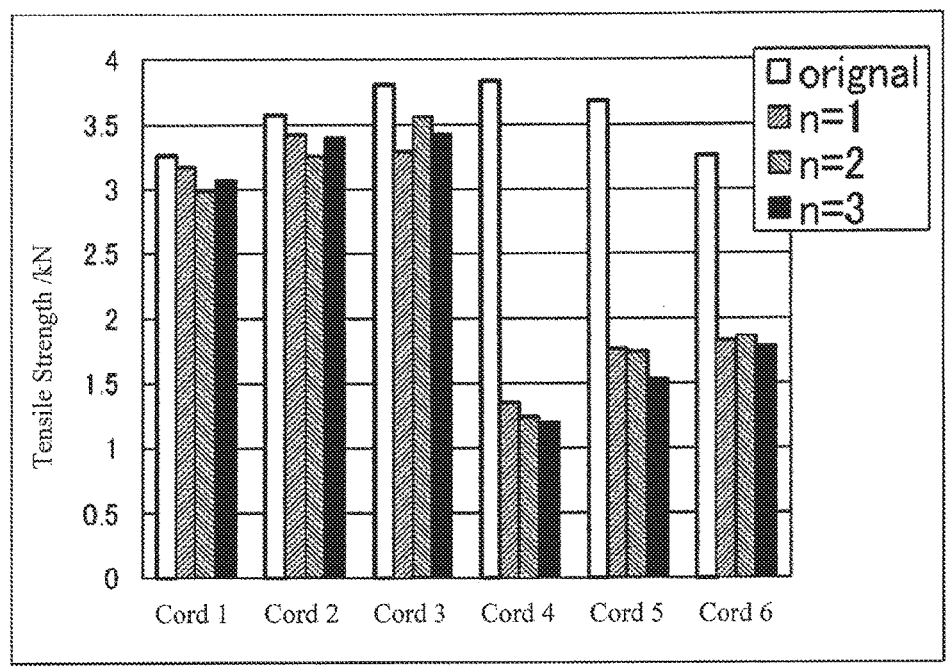
[FIG. 3]
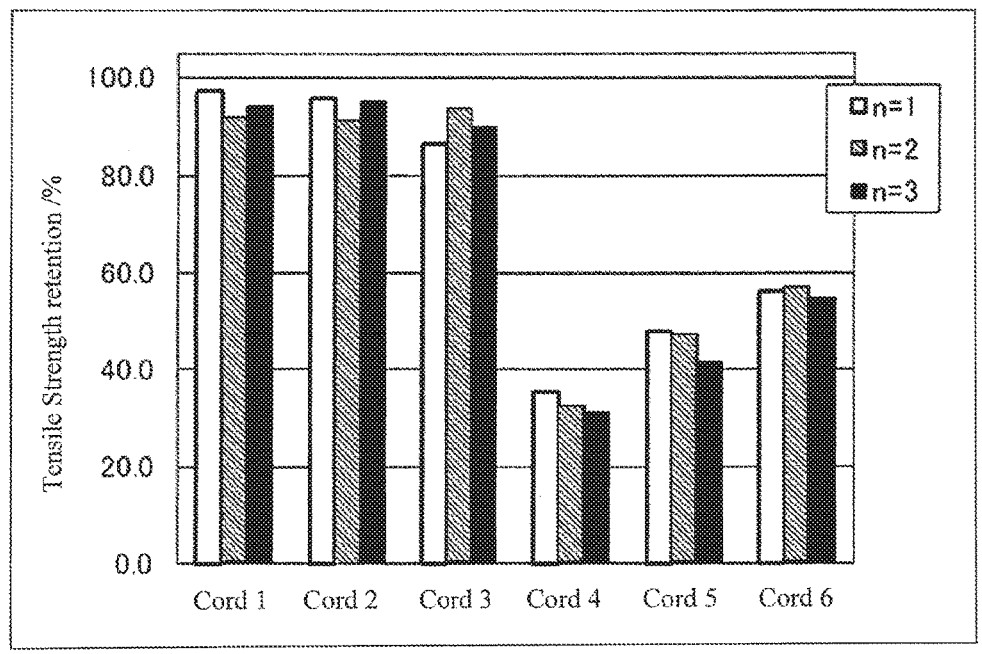

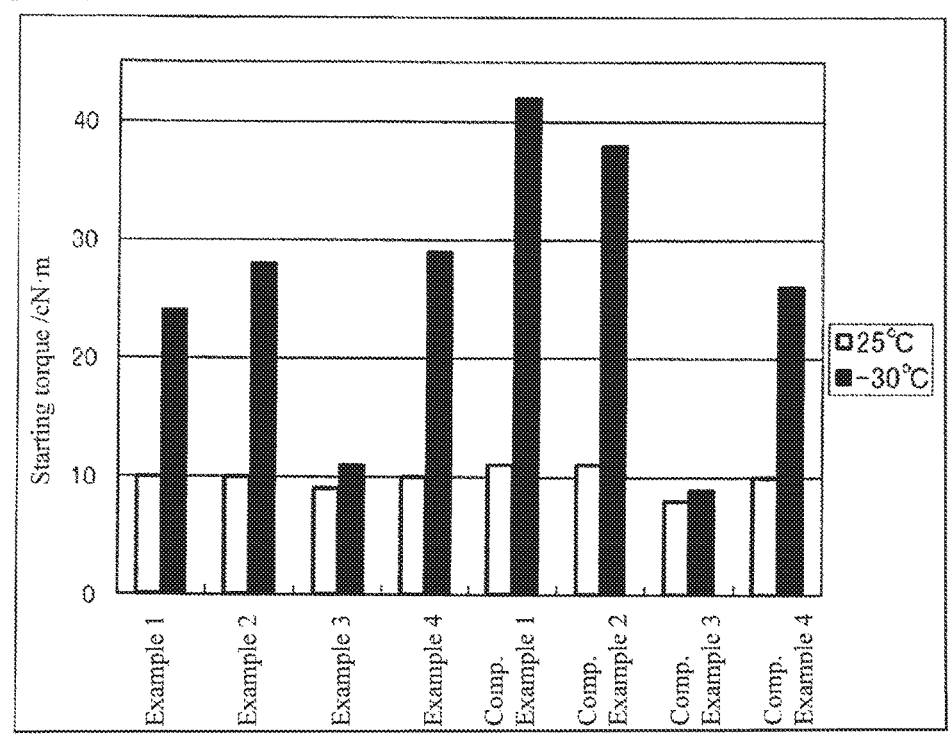

TOOTHED BELT

CROSS REFERENCE TO RELATED APPLICATIONS:

This is a U.S. National Phase Application under 35 U.S.C. § 371 of International Application No. PCT/JP2015/062748, filed Apr. 27, 2015, which claims priority to Japanese Application Nos. 2014-093930, filed Apr. 30, 2014 and 2015-083109, filed Apr. 15, 2015, and which was published Under PCT Article 21(2), the entire contents of which are incorporated herein by reference.

TECHNICAL FIELD

The present invention relates to a toothed belt.

BACKGROUND ART

Bending fatigue resistance is required for a toothed belt to be used in automobile uses such as transmission drive of an overhead camshaft (OHC), balancer drive, oil pump drive, or opening/closing drive of a slid door of automobiles. Accordingly, there is known a technology of improving the bending fatigue resistance by using a Lang-twisted cord as a tension member of the toothed belt (see Patent Documents 1 and 2). Here, Lang twist is one in which one or two or more pieces of a fiber are arranged and twisted (primary twist) and two or more pieces of the resulting one are arranged and twisted in the same direction as the direction in the primary twist (final twist).

On the other hand, the toothed belt to be used in the automobile uses are used under conditions at cold regions, for example, an extremely low temperature state of from −20° C. to −30° C., or used under highly humid or rainwater-attaching conditions. That is, the toothed belt to be used in the automobile uses is sometimes necessary to have water resistance and cold resistance while the bending fatigue resistance is secured, depending on the use environment.

For example, under the highly humid or rainwater-attaching conditions such as automobile travel at rainfall time, when the toothed belt comes into contact with water and water infiltrates into an embedded cord, the cord wetted with water swells and an adhesive component (RFL solid matter) covering around the cord separates. Then, the water promotes fatigue deterioration of the cord owing to bending, severance of the cord is caused, and thus the strength of the toothed belt remarkably decreases, so that there arises a problem that the severance of the toothed belt is likely to occur. Accordingly, there has been developed a technology of changing the cord of the toothed belt to a plied cord and improving water resistance by subjecting the plied cord to a surface treatment with a rubber cement or an overcoat (see Patent Documents 3 and 4). Here, ply twist is one in which one or two or more pieces of a fiber are arranged and twisted (primary twist) and two or more pieces of the resulting one are arranged and twisted in the reverse direction to the direction in the primary twist (final twist). The plied cord shows an advantage of little occurrence of kink as compared with the Lang-twisted cord. However, in such a toothed belt with the plied cord, there arises a problem that the bending fatigue resistance is insufficient. Therefore, a toothed belt excellent in water resistance is required while the bending fatigue resistance is secured.

Moreover, under conditions at cold regions, that is, extremely low temperature (e.g., from −20° C. to −30° C.), for example, the toothed belt is left standing in the extremely low temperature state during the automobile engine is stopped at night and a portion at which the belt is wound on a pulley is hardened at the low temperature while being bent. When the toothed belt is used in such a state, large torque is necessary for the start of the engine in the morning and the hardened toothed belt severely gets fatigue through rapid stretching and there is a concern that cracks are generated in an early period and severance of the toothed belt is caused due to extension of the cracks. Therefore, there is required a toothed belt excellent in cold resistance, which is not hardened even when it is left standing in an extremely cold state and can be started at a small torque.

PRIOR ART DOCUMENT

Patent Document

Patent Document 1: JP-UM-Y-S59-15780
Patent Document 2: JP-B-S62-7413
Patent Document 3: JP-A-H07-27179
Patent Document 4: JP-A-H09-124802

SUMMARY OF THE INVENTION

Problems that the Invention is to Solve

The present invention is for solving the aforementioned problems, and an object thereof is to provide a toothed belt excellent in water resistance and cold resistance while bending fatigue resistance is secured.

Means for Solving the Problems

In order to solve the above problems, the toothed belt of the present invention is a toothed belt containing tooth parts that are disposed at predetermined intervals along the belt longitudinal direction, a cord, and a back side that has the cord embedded therein, in which the cord contains a Lang-twisted glass fiber, an adhesion treatment layer, and an overcoat treatment layer, the overcoat treatment layer is formed on the surface of the adhesion treatment layer, the back side is composed of a rubber composition, and the rubber composition contains from 5 parts by mass to 20 parts by mass of a plasticizer based on 100 parts by mass of a rubber component.

According to the configuration of the toothed belt of the present invention, since the cord is configured by Lang twist, as compared to plied cords, the cord is excellent in abrasion resistance even when water infiltrates and swelling occurs, so that the surface thereof is structurally less likely to wear and the adhesive component hardly separates. Therefore, protection of the cord relatively remains and thus water resistance is improved. Moreover, since the overcoat treatment layer is further formed on the surface of the adhesion treatment layer of the cord, the severance or the like of the fiber resulting from infiltration of water into the cord is less likely to occur. Furthermore, since the cord is composed of a glass fiber, elongation and change with temperature are small, so that dimensional stability is excellent and bending fatigue resistance can be maintained not only at normal temperature but also at an extremely low temperature. In addition, since a plasticizer is added to the rubber composition constituting the back side, the toothed belt is not hardened even when it is left standing at an extremely low temperature for a long period of time and has such a degree of flexibility that there is not so much difference to that at normal temperature, and thus cold resistance can be improved. Incidentally, in the rubber composition constituting the back side, in the case where the addition amount of the plasticizer is less than 5 parts by mass based on 100 parts by mass of the rubber component, it is impossible to impart such a degree of flexibility that is not so much different from that at normal temperature to the rubber composition at an extremely low temperature. On the other hand, in the case where the addition amount of the plasticizer exceeds 20 parts by mass, the toothed belt becomes too soft, so that tooth shearing force of the toothed belt decreases.

In the above-mentioned toothed belt, the plasticizer preferably contains at least one selected from the group consisting of ether-based, ester-based, ether ester-based, phthalic acid-based, and adipic acid-based ones.

By adding any of these plasticizers, the toothed belt is not hardened even when it is left standing at an extremely low temperature for a long period of time and can have such a degree of flexibility that there is not so much difference to that at normal temperature. Of these, the most preferred is an adipic acid-based plasticizer that can impart such a degree of flexibility that there is not so much difference to that at normal temperature even at an extremely low temperature to the rubber composition by the addition thereof in a small amount.

In the above-mentioned toothed belt, it is preferred that the rubber composition constituting the back side has a rubber hardness measured at 25° C. of from 70° to 85°.

In the case where the rubber hardness measured at 25° C. of the rubber composition constituting the back side falls within the above range, usable rubber hardness of the toothed belt can be secured at normal temperature. Incidentally, if the rubber hardness is less than 70°, since the toothed belt is too soft, there arises a problem that it adheres to a pulley or the like on which it is wound. On the other hand, if the rubber hardness exceeds 80°, since the toothed belt is too hard, there arises a problem in bendability at the time when the belt is wound on a pulley or the like. Here, the rubber hardness is hardness measured by using a type A durometer in accordance with JIS K 6253 (2012) and is judged by hardness of the back side rubber of the toothed belt left standing under an atmosphere of 25° C. for 90 minutes.

In the above-mentioned toothed belt, the rubber hardness at −30° C. of the rubber composition constituting the back side is preferably from +0° to +4° as compared to the rubber hardness at 25° C.

In the case where the rubber hardness measured at −30° C. of the rubber composition constituting the back side falls within the above range, the toothed belt has such a degree of flexibility that there is not so much difference to that at normal temperature, so that it is not hardened even when it is left standing at an extremely low temperature for a long period of time, and thus cold resistance can be improved. Here, the rubber hardness is hardness measured by using a type A durometer in accordance with JIS K 6253 (2012) and is judged by hardness of the back side rubber of the toothed belt left standing under an atmosphere of each of −30° C. and 25° C. for 90 minutes.

In the above-mentioned toothed belt, starting torque at −30° C. is preferably less than 30 cN·m.

In the case where the starting torque at −30° C. falls within the above range, cracks (cracking) can be suppressed at belt start and during subsequent drive even at an extremely low temperature. That is, even at an extremely low temperature, crack resistance can be maintained. Here, as the starting torque, for a toothed belt left standing under an atmosphere of −30° C. for 90 minutes in a state of being wound on pulleys of a two-axis layout, there is measured torque required for starting by rotating the pulleys by 180°.

In the above-mentioned toothed belt, the rubber composition constituting the back side preferably contains at least chloroprene rubber. Moreover, it is preferred that the tooth parts are composed of a rubber composition and the rubber composition contains at least chloroprene rubber.

The toothed belt can be constituted by using chloroprene rubber that is inexpensive.

In the above-mentioned toothed belt, the glass fiber is preferably alkali-free glass.

The toothed belt can be constituted by using alkali-free glass that is inexpensive.

Advantageous Effect of the Invention

As mentioned in the above explanation, according to the present invention, a toothed belt excellent in water resistance and cold resistance can be obtained while bending fatigue resistance is secured.

BRIEF DESCRIPTION OF DRAWINGS

FIG. 1 is a cross-sectional perspective view of the toothed belt according to an embodiment of the present invention.

FIG. 2 is a graph showing the results of measurement on tensile strength before and after a water-pouring running test in toothed belts according to the present Examples.

FIG. 3 is a graph showing the tensile strength retention calculated based on tensile strength before and after a water-pouring running test in toothed belts according to the present Examples.

FIG. 4 is a graph showing the results of a starting torque measurement test in toothed belts according to the present Examples.

MODE FOR CARRYING OUT THE INVENTION

The following will explain embodiments of the present invention with reference to Drawings.

(Configuration of Toothed Belt)

As illustrated in FIG. 1, the toothed belt 1 of the present embodiment contains a belt main body 10 containing a plurality of tooth parts 2 which are disposed at predetermined intervals along the belt longitudinal direction (arrow in the figure), a plurality of cords 3, and a back side 4 in which a plurality of the cords 3 are embedded, and a tooth fabric 5 with which the surface of a plurality of the tooth parts 2 is covered.

The belt main body 10 having a plurality of the tooth parts 2 and the back side 4 is composed of a rubber composition. As for the rubber composition constituting the belt main body 10, use can be made of chloroprene rubber, acrylonitrile-butadiene rubber, hydrogenated acrylonitrile-butadiene rubber (HNBR), natural rubber, EPT (ethylene-propylene terpolymer), styrene-butadiene rubber, butyl rubber, chlorosulfonated polyethylene rubber, or the like. The rubber composition constituting the belt main body 10 is preferably a polymer having an excellent cold resistance. Particularly, in view of inexpensiveness, chloroprene rubber is preferred. Incidentally, as the rubber composition constituting the tooth parts 2 and the back side 4, the same rubber composition may be used or different rubber compositions may be used.

A plasticizer is added to the rubber composition constituting the back side 4. Incidentally, it is sufficient that the plasticizer is added to the rubber composition constituting the back side 4 and may be added or may not be added to the rubber composition constituting the tooth parts 2. By adding the plasticizer, the toothed belt is not hardened even when it is left standing at an extremely low temperature for a long period of time and can have such a degree of flexibility that there is not so much difference to that at normal temperature. As the plasticizer, for example, ether-based, ester-based, ether ester-based, phthalic acid-based, and adipic acid-based plasticizers can be used. Of these, the most preferred are adipic acid-based plasticizers that can impart such a degree of flexibility that there is not so much difference to that at normal temperature even at an extremely low temperature to the rubber composition by the addition thereof in a small amount. Examples of the adipic acid-based plasticizers include dioctyl adipate (DOA), diisononyl adipate (DINA), diisodecyl adipate (DIDA), and the like. Here, "such a degree of flexibility that is not so much different from that at normal temperature" specifically means that the rubber hardness at −30° C. is preferably from +0° to +4° as compared to the rubber hardness at 25° C. Incidentally, the rubber hardness is hardness measured by using a type A durometer in accordance with JIS K 6253 (2012) and is judged by hardness of the back side rubber of the toothed belt 1 left standing under an atmosphere of each of −30° C. and 25° C. for 90 minutes.

The addition amount of the plasticizer is from 5 to 20 parts by mass based on 100 parts by mass of the rubber component. In the case where the addition amount is less than 5 parts by mass, such a degree of flexibility that is not so much different from that at normal temperature cannot be imparted to the rubber composition an extremely low temperature. On the other hand, in the case where the addition amount exceeds 20 parts by mass, since the toothed belt 1 becomes too soft, the tooth shearing force of the toothed belt 1 decreases. Here, in order to secure tooth crack resistance even in the case of adding the plasticizer, the tooth shearing force of the toothed belt 1 is preferably from 800 N to 1500 N. Incidentally, with regard to the tooth shearing force, one tooth of the toothed belt 1 is stretched at a rate of 50±10 mm/min by an autograph in a state that the tooth is pressed under a certain pressure, and a maximum value of tensile values is taken as the tooth shearing force. Furthermore, in order to maintain crack resistance even at an extremely low temperature, the starting torque at −30° C. is preferably less than 30 cN·m. Incidentally, as the starting torque, for the toothed belt 1 left standing under an atmosphere of −30° C. for 90 minutes in a state of being wound on pulleys of a two-axis layout, there is judged torque required for starting by rotating the pulleys by 180°.

In the back side 4 of the belt main body 10, a plurality of the cords 3 respectively extending in the belt longitudinal direction are embedded in the back side 4 with arranging them in the belt width direction. The cord 3 is a Lang-twisted cord in which one or two or more pieces of a glass fiber are arranged and twisted (primary twist) and two or more pieces of the resulting one are arranged and twisted in the same direction as the direction in the primary twist (final twist). By adopting Lang twist, the bending fatigue resistance can be maintained not only at normal temperature but also at an extremely low temperature and also water resistance of the cord 3 can be improved. Since the Lang-twisted cord 3 is excellent in abrasion resistance even when water infiltrates and swelling occurs, the surface thereof is structurally less likely to wear and the adhesive component hardly separates. Therefore, protection of the cord 3 relatively remains and thus the water resistance is improved. Moreover, the glass fiber constituting the cord 3 may be either alkali-free glass (E glass) or high-strength glass containing much Si component (K, U, or S glass), and is not limited in thickness of filament, the convergence number of filaments and the number of strands. Of these glass fibers, from the viewpoint of "inexpensiveness", the alkali-free glass (E glass) is most preferred.

The cord 3 is subjected to an adhesion treatment for enhancing adhesion to the rubber composition constituting the back side 4. Here, as the adhesion treatment, for example, the glass fiber constituting the cord 3 is immersed in a resorcin-formalin-latex treating liquid (RFL treating liquid) and subsequently dried under heating to form an adhesion treatment layer on the surface uniformly. The RFL treating liquid is obtained by mixing an initial condensate of resorcin and formalin into a latex, and examples of the latex used here include chloroprene, a styrene-butadiene-vinylpyridine terpolymer (VP latex), hydrogenated acrylonitrile-butadiene, NBR, and the like. Incidentally, as the adhesion treatment, there is also known a method of performing a treatment with the RFL treating liquid after pre-treatment with an epoxy or isocyanate compound.

Here, to the RFL treating liquid is preferably added at least one vulcanization aid among an aqueous dispersion of a sulfur compound, a quinone oxime-based compound, a methacrylate-based compound, and a maleimide-based compound or one obtained by dispersing any of these vulcanization aids in water. As the aqueous dispersion of a sulfur compound, for example, an aqueous dispersion of sulfur, tetramethylthiuram disulfide, or the like may be employed. As the quinone oxime-based compound, for example, p-quinone dioxime or the like may be employed. As the methacrylate-based compound, for example, ethylene glycol dimethacrylate, trimethylolpropane trimethacrylate or the like may be employed. As the maleimide-based compound, for example, N,N'-m-phenylenebismaleimide, N,N'-(4,4'-diphenylmethanebismaleimide), or the like may be employed. Incidentally, "water" in the "one obtained by dispersing any of these vulcanization aids in water" may be, for example, one containing a little amount of an alcohol such as methanol. According to this, even in the case where "the vulcanization aid" is insoluble in water, the affinity of "the vulcanization aid" to water is improved and "the vulcanization aid" is easily dispersed.

The following effects are expected by the addition of the vulcanization aid to the RFL treating liquid. That is, chemical bonding force between the layers of the rubber latex component contained in the RFL treating liquid and an outer layer rubber (it means a rubber composition constituting the overcoat treatment layer formed by an overcoat treatment to be mentioned later) is strengthened and thereby, the adhesion is improved, the exfoliation of the adhesion treatment layer of the cord 3 is suppressed, and the water resistance of the cord 3 is improved. As an effect to be further expected, the chemical bonding force (force of crosslinking) of the rubber latex component itself contained in the RFL treating liquid is strengthened and, as a result, it is considered that the exfoliation owing to the destruction of the outer layer rubber that is a target to be adhered precedes the exfoliation owing to cohesive failure of the adhesive layer (adhesion treatment layer) (i.e., interlayer exfoliation).

Also, in the case of adding the vulcanization aid to the RFL treating liquid, the immersion treatment of the glass fiber constituting the cord 3 may be performed with dividing the treatment into two. In this case, first, in a first immersion treatment, any of the vulcanization aids described above is not added to the RFL treating liquid. This is because, in the first immersion treatment, thermal curing of RF is prioritized over crosslinking of the rubber latex component. On the other hand, in the second immersion treatment, use is made of an RFL treating liquid which contains a larger amount of a rubber latex component in comparison to the first RFL treating liquid and to which at least one vulcanization aid among an aqueous dispersion of a sulfur compound, a quinone oxime-based compound, a methacrylate-based compound, and a maleimide-based compound or one obtained by dispersing the vulcanization aid in water. Incidentally, the reason why a difference in the proportion of the rubber latex component in the RFL treating liquid is provided between the first immersion treatment and the second immersion treatment is that it is intended to enhance the adhesion of the RFL layer to both the fiber and the rubber which have different affinity.

Moreover, the surface of the adhesion treatment layer of the cord 3 after the adhesion treatment such as the RFL treatment is further subjected to an overcoat treatment with a rubber cement or the like to form an overcoat treatment layer. Since the overcoat treatment layer is further formed on the surface of the adhesion treatment layer with the RFL treatment or the like, the water resistance of the cord 3 increases and the severance of the glass fiber and the like caused by the infiltration of water into the cord 3 is less likely to occur. Here, the overcoat treatment is performed by immersing the cord 3 subjected to the adhesion treatment such as RFL treatment with a treating liquid obtained by dissolving a rubber composition such as hydrogenated acrylonitrile-butadiene rubber (H-NBR) or chlorosulfonated polyethylene rubber (CSM) in an organic solvent such as methyl ethyl ketone, toluene, or xylene, and subsequently drying the cord under heating to form an overcoat treatment layer uniformly on the surface.

The tooth fabric 5 is formed of a canvas and uses, as a base material, a fiber-woven fabric made by weaving a warp yarn 7 extending to the belt longitudinal direction and a weft yarn 6 extending to the belt width direction. As a material of the fiber materials forming the weft yarn 6, the warp yarn 7 and the like, any of nylon, aramid, polyester, polybenzoxazole, and cotton or a combination thereof may be employed. The form of the fiber may be any of a filament yarn and a spun yarn, and may be any of a twisted yarn having a sole composition or a blended twisted yarn and a blended yarn. In the case of a toothed belt, nylon, aramid, or the like is suitably used depending on use environment and required life. The weave structure of the tooth fabric may be any of a twill weave, satin weave, flat weave, and the like.

In order to enhance the adhesion between the rubber composition of the belt main body 10 and the tooth fabric 5, the tooth fabric 5 is preferably adhered to the rubber constituting the tooth parts 2 through a series of adhesion treatments including the following steps.

(1) A fiber-woven fabric constituting the tooth fabric 5 is immersed in a RFL treating liquid and subsequently drying under heating to form an adhesion treatment layer uniformly on the surface. Here, in a similar manner as mentioned above, to the RFL treating liquid is preferably added at least one vulcanization aid among an aqueous dispersion of a sulfur compound, a quinone oxime-based compound, a methacrylate-based compound, and a maleimide-based compound or one obtained by dispersing any of these vulcanization aids in water.

(2) A rubber composition is dissolved in an organic solvent such as methyl ethyl ketone, toluene, or xylene to form a rubber cement and an epoxy or isocyanate compound is incorporated into the rubber cement to prepare a treating liquid. The tooth fabric 5 is immersed therein to perform a pre-treatment.

(3) A rubber composition is dissolved in an organic solvent such as methyl ethyl ketone, toluene, or xylene to form a rubber cement and the tooth fabric 5 is subjected to an immersion treatment in the rubber cement to impregnate and attach the tooth fabric 5 with the rubber composition, thereby forming an adhesion treatment layer.

It is not necessary to perform all the above adhesion treatments of (1) to (3) and any one solely or a combination of two or more thereof may be preformed as needs. The order of the treatments and the number of the treatment times is not particularly limited. However, the pre-treatment of (2) is performed before the rubber cement treatment of (3). For example, in the case of adding the vulcanization aid to the RFL treating liquid in the treatment of (1), since the adhesive force between the fiber-woven fabric and the rubber is considerably enhanced by this treatment alone, the pre-treatment of (2) or the pre-treatment of (2) and the rubber cement treatment of (3) may be omitted. Here, in the case where a vulcanization aid is added to the RFL treating liquid of (1), it is preferable to add the same vulcanization aid as the one added to the RFL treating liquid also to the rubber cement and the rolled rubber to be used in the coat treatment to be mentioned later. Thereby, a remarkable improvement in adhesive force between the fiber-woven fabric treated with the RFL treating liquid and the rubber cement can be expected.

Moreover, in order to further enhance the adhesion between the tooth fabric 5 subjected to the adhesion treatment and the rubber composition of the belt main body 10, an imprint treatment of the rubber composition to the tooth fabric 5 by passing the tooth fabric 5 and the rubber composition through a calender roll or a treatment of laminating the rubber composition onto the side of the tooth fabric 5 to be adhered to the tooth parts 2 may be performed. That is, a treatment of coating the surface of the fiber-woven fabric constituting the tooth fabric 5 with a rolled rubber to form an adhesion treatment layer may be performed, or a treatment of coating the fiber-woven fabric constituting the tooth fabric 5 toward the tooth parts 2 with a rubber cement and a rolled rubber in this order to form an adhesion treatment layer may be performed. These treatments are also referred to as coat treatments.

(Molding Method of Toothed Belt)

The toothed belt 1 according to the present embodiment is, for example, prepared by the following method. First, a canvas forming the tooth fabric 5 is wound on a cylindrical mold having a plurality of recessed stripes corresponding to the tooth parts 2 of the toothed belt 1. Subsequently, a cord constituting the cord 3 is wound on the cylindrical mold, on which the canvas has been wound, so as to have a predetermined pitch in the longitudinal direction of the cylindrical mold. Then, a rubber sheet forming the back side 4 and the tooth parts 2 is wound on the mold to form an unvulcanized sleeve. Thereafter, the cylindrical mold on which the unvulcanized sleeve has been wound is transferred into a vulcanizer and is heated and pressurized to thereby press the rubber sheet into mold groove parts to form the tooth parts 2. Each toothed belt 1 is obtained by cutting the resultant sleeve-like molded body with a cutting blade according to a predetermined cutting width.

Alternatively, the toothed belt 1 can be prepared by a preforming method. In the preforming method, the belt is prepared by the following procedures. First, the tooth fabric 5 and the tooth parts 2 are preliminary molded by using a mold having a tooth form to obtain a preform. Then, the resultant preform is wound on a mold, and thereon is spun the cord 3 spirally. Subsequently, an unvulcanized rubber constituting the back side 4 is wound thereon, and thereafter the whole is vulcanized in a vulcanizer to thereby obtain the toothed belt 1. In the preforming method, since the tooth fabric 5 and the tooth parts 2 are preliminarily molded before vulcanization, it is not necessary to make the unvulcanized rubber constituting the back side 4 flow through gaps between the cords into the inside (ventral side, i.e., side of the tooth parts 2) and make the tooth fabric 5 tense to form the tooth parts 2 at the time of vulcanization. Thus, it becomes possible to narrow the distance (pitch) between the cords.

As above, in the toothed belt 1 according to the present embodiment, since the cord 3 is configured by Lang twist, as compared to plied cords, the cord is excellent in abrasion resistance even when water infiltrates and swelling occurs, so that the surface thereof is structurally less likely to wear and the adhesive component hardly separates. Therefore, protection of the cord relatively remains and thus the water resistance is improved. Moreover, since the overcoat treatment layer is further formed on the surface of the adhesion treatment layer of the cord 3, the severance or the like of the fiber to be caused by the infiltration of water into the cord 3 is less likely to occur. Furthermore, since the cord 3 is composed of a glass fiber, elongation and change with temperature are small, so that dimensional stability is excellent and bending fatigue resistance can be maintained not only at normal temperature but also at an extremely low temperature. In addition, since a plasticizer is added to the rubber composition constituting the back side 4, the toothed belt 1 is not hardened even when it is left standing at an extremely low temperature for a long period of time and has such a degree of flexibility that is not so much different from that at normal temperature and thus the cold resistance can be improved.

Examples

Water Resistance Evaluation Test of Cord of Toothed Belt

First, a water resistance evaluation test was performed for cords 1 to 3 of toothed belts according to the present Examples and for cords 4 to 6 of toothed belts according to Comparative Examples.

As for the cords 1 to 6, those in which primary twist and final twist were imparted to a glass fiber were used. As the cord 1, the number of primary twist was set to 16 (T/10 cm) and the number of final twist was set to 8 (T/10 cm); as the cords 2 and 4 to 6, the number of primary twist was set to 12 (T/10 cm) and the number of final twist was set to 8 (T/10 cm); and as the cord 3, the number of primary twist was set to 8 (T/10 cm) and the number of final twist was set to 8 (T/10 cm). Here, as the glass fiber, E glass was used. In the glass fiber, the raw yarn was ECG-150, the strand structure was ⅗, and the cord diameter was 0.9 mm. The cords 1 to 3 and 6 were configured by Lang twist and the cords 4 and 5 were configured by ply twist.

Then, for each of the cords 1 to 6, an adhesion treatment (RFL treatment) with a RFL treating liquid was performed. In the adhesion treatment, the glass fiber to which primary twist and final twist had been imparted was immersed in the RFL treating liquid shown in Table 1, followed by a heat treatment at from 200° C. to 280° C.

TABLE 1

| | part(s) by mass |
|---|---|
| Resorcin | 1.35 |
| Formalin (solid concentration: 37%) | 1 |
| Vinylpyridine latex (solid concentration: 40%) | 130 |
| Water | 50 |

After the RFL treatment, for each of the cords 1 to 3 and 5, an overcoat treatment was performed. In the overcoat treatment, the glass fiber after the RFL treatment was immersed in the treating liquid shown in Table 2, followed by a heat treatment at from 130° C. to 180° C.

TABLE 2

| | parts by mass |
|---|---|
| H-NBR latex | 10 |
| Methyl ethyl ketone | 90 |

The configurations of the cords 1 to 6 prepared as above are shown in the following Table 3. Incidentally, as shown in Table 3, kink occurs in the cord 6 alone. This fact shows that a Lang-twisted cord originally has a problem that kink is likely to occur and kink occurs in the Lang-twisted cord 6 not subjected to the overcoat treatment but, in Lang-twisted cords 1 to 3, the occurrence of kink can be suppressed by performing the overcoat treatment.

TABLE 3

| | Cord 1 | Cord 2 | Cord 3 | Cord 4 | Cord 5 | Cord 6 |
|---|---|---|---|---|---|---|
| Constituent fiber | Glass fiber | Glass fiber | Glass fiber | Glass fiber | Glass fiber | Glass fiber |
| Number of primary twist (T/10 cm) | 16 | 12 | 8 | 12 | 12 | 12 |
| Number of final twist (T/10 cm) | 8 | 8 | 8 | 8 | 8 | 8 |
| Twist manner | Lang twist | Lang twist | Lang twist | Ply twist | Ply twist | Lang twist |
| Cord diameter (mm) | 0.9 | 0.9 | 0.9 | 0.9 | 0.9 | 0.9 |
| RFL treatment | yes | yes | yes | yes | yes | yes |
| Overcoat treatment | yes | yes | yes | no | yes | no |
| Occurrence of kink | no | no | no | no | no | yes |

Then, toothed belts were prepared by using the cords 1 to 6, respectively. The rubber compositions to be used in the preparation of the toothed belt were as shown in Table 4.

TABLE 4

| | part(s) by mass |
|---|---|
| Chloroprene rubber | 100 |
| Adipic acid-based plasticizer | 10 |
| Magnesium oxide | 5 |
| Antiaging agent | 20 |
| Vulcanization accelerator | 2 |
| Carbon black | 50 |
| Inorganic filler | 30 |
| Zinc oxide | 5 |
| Sulfur | 1 |
| Total | 223 |

Also, the configuration of the fiber-woven fabric used in the tooth fabric is as follows. As the composition, the weft yarn is nylon 66 and spandex and the warp yarn is nylon 66.

As the yarn configuration, the weft yarn is 155 dtex and 122 dtex and the warp yarn is 155 dtex. As the density, the weft yarn is 95±5 yarns/3 cm and the warp yarn is 116 yarns/3 cm. Moreover, the weave structure is twill weave. The tooth fabric having the above configuration was subjected to a RFL treatment with the RFL treating liquid shown in Table 1. Thereafter, an adhesion treatment was performed with a rubber cement obtained by dissolving the rubber blend shown in Table 4 in toluene and further, a coat treatment was performed through the lamination with a rubber composition sheet having the formulation shown in Table 4.

Then, after the tooth fabric subjected to the above treatments was wound on a mold for belt molding so that the tooth fabric face became a belt surface, each of the cords 1 to 6 shown in Table 3 was wound on the tooth fabric of the mold on which the tooth fabric had been wound. Furthermore, a rubber sheet composed of the chloroprene rubber blend shown in Table 4 was wound thereon. Thereafter, the resultant one was placed in a vulcanizer and tooth shapes were formed by a usual pressing method. Then, vulcanization was performed at 161° C. for 25 minutes. Belt back surface was ground at a certain thickness and was cut into a certain width to obtain a toothed belt. The prepared toothed belt has a width of 8 mm, a circumferential length of 1,000 mm, a tooth shape S5M (STPD tooth shape, tooth pitch: 5.0 mm), and the number of teeth of 200.

Then, for each of the cords 1 to 6, a water-pouring running test of the prepared toothed belts was performed and water resistance of the cords was evaluated. In the water-pouring running test, the toothed belt was wound on a driving pulley (Dr) having 16 teeth and a driven pulley (Dn) having 16 teeth, and a continuous durability test (running time: 40 hours) was repeated three times under the running conditions shown in Table 5 in a state where the driven pulley was dipped in a vessel containing water.

TABLE 5

| Number of rotations at driving side | 400 rpm |
| --- | --- |
| Tension | 100N |
| Atmospheric temperature | 23° C. |
| Running time | 40 hours |

Tensile strength before the water-pouring running test and tensile strength after the water-pouring running test were measured and, based on the retention of the tensile strength before and after the running test, the water resistance of the toothed belts prepared by using the cords 1 to 6 was evaluated. The results are shown in FIG. 2 and FIG. 3. FIG. 2 is a graph showing the results of measuring the tensile strength before and after the water-pouring running test. FIG. 3 is a graph showing the tensile strength retention calculated based on the tensile strength before and after the water-pouring running test. In FIG. 2 and FIG. 3, "original" shows the measurement results before the water-pouring running test; and n=1, 2, and 3 show the measurement results after the water-pouring running test was performed once, twice, and three time, respectively. Furthermore, Table 6 summarizes the results of FIG. 2 and FIG. 3 and the measurement results after the water-pouring running test show average values of the measurement results of n=1, 2, and 3. In the evaluation of the water resistance shown in Table 6, one exhibiting a tensile strength retention of 80% or more was designated as Good, one exhibiting a retention of 40% or more and less than 80% was designated as Moderate, and one exhibiting a retention of less than 40% was designated as Bad.

TABLE 6

| | Cord 1 | Cord 2 | Cord 3 | Cord 4 | Cord 5 | Cord 6 |
| --- | --- | --- | --- | --- | --- | --- |
| Tensile strength before water-pouring running test (kN) | 3.26 | 3.57 | 3.80 | 3.83 | 3.68 | 3.26 |
| Tensile strength after water-pouring running test (kN) | 3.08 | 3.36 | 3.42 | 1.26 | 1.68 | 1.82 |
| Tensile strength retention (%) | 94.5 | 94.1 | 90.0 | 32.9 | 45.7 | 55.8 |
| Water resistance evaluation | Good | Good | Good | Bad | Moderate | Moderate |

From FIG. 2, FIG. 3 and Table 6, it is found that the cords (cords 1 to 3) which were Lang-twisted and in which the adhesion treatment layer was subjected to an overcoat treatment to form an overcoat treatment layer exhibited a high tensile strength retention and were excellent in water resistance. More precisely, the toothed belts using Lang-twisted cords (cords 1 to 3 and 6) had improved water resistance as compared to the plied cords (cords 4 and 5). It is considered that this is because, since a Lang-twisted cord is excellent in abrasion resistance even when water infiltrates and the cords are swollen, the surface is structurally less likely to wear and the adhesive component is less likely to separate. As a result, in the Lang-twisted cord, as compared to the plied cord, the protection of the cord relatively remains and the water resistance becomes high. Furthermore, by subjecting the Lang-twisted cords to the overcoat treatment (cords 1 to 3), as compared to the cord not subjected to the overcoat treatment (cord 6), the water resistance was further improved. It is considered that this is because a protective layer (overcoat treatment layer) is formed on the cord by performing the overcoat treatment and thus the contact with water is prevented.

(Physical Property Evaluation Tests of Rubber Composition)

Then, physical property evaluation tests were performed for the rubber compositions constituting the tooth parts and back side of the toothed belts according to the present Examples.

The formulations of the rubber compositions are 7 kinds of formulations 1 to 7 as shown in Table 7. Here, a plasticizer was added to the rubber compositions of the formulations 2 to 7. No plasticizer was added to the rubber composition of the formulation 1. Incidentally, an adipic acid-based plasticizer was added to the rubber compositions of the formulations 2 to 6, and an ether ester-based plasticizer was added to the rubber composition of the formulation 7. The formulations of the rubber compositions shown in Table 7 were shown in parts by mass of the plasticizer and the like based on 100 parts by mass of the rubber component.

After rubber kneading, the rubber compositions of the formulations 1 to 7 were vulcanized at 161° C. for 25 minutes and test pieces for physical property evaluation tests (individual tests of a rubber hardness measurement test, a low-temperature impact brittleness test, and a Gehman torsion test, which are mentioned later) of the rubber compositions were prepared. Then, for each of the rubber compositions of the formulations 1 to 7, as physical property evaluation tests of the rubber composition, the rubber hardness measurement test, the low-temperature impact brittleness test, and the Gehman torsion test were carried out.

Here, the rubber hardness measurement test was performed in accordance with JIS K 6253 (2012) and measurement was conducted on a JIS A type durometer. The low-temperature impact brittleness test was performed in accordance with JIS K 6261 (2006) and low-temperature impact brittleness temperature was measured. Incidentally, with regard to the low-temperature impact brittleness temperature, a smaller value indicates that flexibility can be maintained until lower temperature and thus cold resistance (low-temperature flexibility) is improved. A sample (test piece) for the low-temperature impact brittleness test had a strip shape of 40.0 mm×6.0 mm×2.0 mm. The Gehman torsion test was performed in accordance with JIS K 6261 (2006) and there was measured a temperature at which torsional rigidity became ten times the value at 23° C., that is, the temperature being T10 in the Gehman torsion test. With regard to the temperature T10 in the Gehman torsion test, a smaller value indicates that flexibility can be maintained until lower temperature and thus cold resistance (low-temperature flexibility) is improved.

Table 7 shows the results of the rubber hardness measurement test, the low-temperature impact brittleness test, and the Gehman torsion test carried out for each of the rubber compositions of the formulations 1 to 7.

ture and the Gehman torsion test temperature of the rubber compositions of the formulations 1 to 6, a decrease in the low-temperature impact brittleness temperature and the Gehman torsion test temperature was observed as the addition amount of the adipic acid-based plasticizer increases. Thereby, it is found that the cold resistance of the rubber composition is improved by adding the adipic acid-based plasticizer. Moreover, with reference to the results of the low-temperature impact brittleness temperature and the Gehman torsion test temperature of the rubber compositions of the formulations 1, 4, and 7, such an effect as that in the cases of the adipic acid-based plasticizer is not obtained in the case of the ether ester-based plasticizer but an improvement in the cold resistance is observed by adding the ether ester-based plasticizer. As above, it is found that the addition of the plasticizer to the rubber composition affords a configuration which does not hardened even at an extremely low temperature and has such a degree of flexibility that is not so much different from that at normal temperature.

(Physical Property Evaluation Tests of Toothed Belt)

Next, for the toothed belts according to the present Examples, physical property evaluation tests were performed.

By using the rubber compositions of the formulations 1 to 7 shown in Table 7 and the cord 2 and the cord 5 shown in Table 6, eight kinds of toothed belts of Examples 1 to 4 and Comparative Examples 1 to 4 were prepared. Incidentally, the tooth fabric used for the toothed belts is the same as that in the aforementioned water resistance test of the cords of the toothed belts. Moreover, the vulcanization conditions for the rubber compositions are 161° C.×25 minutes that is the same as in the aforementioned physical property evaluation

TABLE 7

| | | Formulation 1 | Formulation 2 | Formulation 3 | Formulation 4 | Formulation 5 | Formulation 6 | Formulation 7 |
|---|---|---|---|---|---|---|---|---|
| Formulation of rubber composition | Chloroprene rubber | 100 | 100 | 100 | 100 | 100 | 100 | 100 |
| | Adipic acid-based plasticizer | 0 | 2 | 5 | 10 | 20 | 30 | — |
| | Ether ester-based plasticizer | — | — | — | — | — | — | 10 |
| | Magnesium oxide | 5 | 5 | 5 | 5 | 5 | 5 | 5 |
| | Antiaging agent | 20 | 20 | 20 | 20 | 20 | 20 | 20 |
| | Vulcanization accelerator | 2 | 2 | 2 | 2 | 2 | 2 | 2 |
| | Carbon black | 50 | 50 | 50 | 50 | 50 | 50 | 50 |
| | Inorganic filler | 30 | 30 | 30 | 30 | 30 | 30 | 30 |
| | Zinc oxide | 5 | 5 | 5 | 5 | 5 | 5 | 5 |
| | Sulfur | 1 | 1 | 1 | 1 | 1 | 1 | 1 |
| Total | | 213 | 215 | 218 | 223 | 233 | 243 | 223 |
| Rubber hardness (JIS A°) | | 71 | 69 | 67 | 64 | 58 | 52 | 63 |
| Low-temperature impact brittleness temperature (° C.) | | −32 | −40 | −48 | −50 | −53 | −56 | −38 |
| Gehman torsion test temperature (° C.) | | −34 | −37 | −40 | −41 | −43 | −45 | −36 |

From the results of Table 7, the following facts were found. With reference to the results of rubber hardness of the rubber compositions of the formulations 1 to 6, the rubber hardness was lowered according to the addition amount of the plasticizer. With reference to the results of rubber hardness of the rubber compositions of the formulations 4 and 7, a difference in rubber hardness depending on the kind of the plasticizer was hardly observed. With reference to the results of the low-temperature impact brittleness temperatest for the rubber compositions of the toothed belts according to the present Examples. Furthermore, the method of molding the toothed belts is the same as in the water resistance test of the cords of the toothed belts according to the present Examples except that the belt width is 10 mm.

Then, as physical property evaluation tests for eight kinds of toothed belts of Examples 1 to 4 and Comparative Examples 1 to 4, a tooth shearing force measurement test, a rubber hardness measurement test, a cold-resistant endurance running test, and a starting torque measurement test, which are mentioned later, were carried out.

Here, in the tooth shearing force measurement test of the toothed belt, one tooth is stretched at a rate of 50±10 mm/min by an autograph in a state that the tooth is pressed under a certain pressure and a maximum value of tensile values is taken as the tooth shearing force. The results of the tooth shearing force measurement test performed for each of the toothed belts of Examples 1 to 4 and Comparative Examples 1 to 4 are shown in Table 10. In Table 10, a toothed belt exhibiting a tooth shearing force of 1,200 N or more was evaluated as Excellent, a toothed belt exhibiting a tooth shearing force of 800 N or more and less than 1,200 N was evaluated as Good, and a toothed belt exhibiting a tooth shearing force of less than 800 N was evaluated as Bad.

In the rubber hardness measurement test of the toothed belt, by using a type A durometer in accordance with JIS K 6253 (2012), as rubber hardness, hardness of back side rubber of the toothed belt was measured after the toothed belt was left standing at an atmospheric temperature (25° C., –30° C.) for 90 minutes. The results of the rubber hardness measurement test performed for each of the toothed belts of Examples 1 to 4 and Comparative Examples 1 to 4 are shown in Table 10. In Table 10, a belt exhibiting a difference in the rubber hardness between 25° C. and –30° C. of 4° or less was evaluated as Good and a belt exhibiting a difference of more than 4° was evaluated as Bad.

Moreover, in the rubber hardness measurement test of the toothed belt, it was evaluated whether usable rubber hardness of the toothed belt at normal temperature can be secured or not based on the result whether the rubber hardness measured at 25° C. is from 70° to 85° or not. Here, in the case where the rubber hardness is less than 70°, since the toothed belt is too soft, there arises a problem that the belt adheres to a pulley or the like on which the belt is wound. On the other hand, in the case where the rubber hardness exceeds 80°, since the toothed belt is too hard, there arises a problem in bending ability at the time of winding on a pulley or the like.

With regard to the cold-resistant endurance running test of the toothed belt, after it was left standing under an atmosphere of –30° C. for 15 hours in a state that the toothed belt was wound on a driving pulley (Dr) having 16 teeth and a driven pulley (Dn) having 16 teeth, running time until crack generates at the belt back side was measured under cold-resistant durable running conditions shown in Table 8. The results of the cold-resistant endurance running test performed for each of the toothed belts of Examples 1 to 4 and Comparative Examples 1 to 4 are shown in Table 10. In Table 10, a belt exhibiting a time until crack generation of 50 hours or more was evaluated as Excellent, a belt exhibiting a time of 30 hours or more and less than 50 hours was evaluated as Good, and a belt exhibiting a time of less than 30 hours was evaluated as Bad.

TABLE 8

| | |
|---|---|
| Atmospheric temperature | –30° C. |
| Number of rotations at driving side | 500 rpm |
| Tension | 130N |
| Running time | 60 hours |

With regard to the starting torque measurement test of the toothed belt, after the toothed belt was wound on a driving pulley (Dr) and a driven pulley (Dn) each having 18 teeth and was left standing under an atmospheric temperature (25° C., –30° C.) for 90 minutes, the pulley was manually rotated with a torque gauze under conditions shown in Table 9 and starting torque at this time was measured. Incidentally, a toothed belt excellent in cold resistance can suppress operation force (starting torque) low. The results of the starting torque measurement test performed for each of the toothed belts of Examples 1 to 4 and Comparative Examples 1 to 4 are shown in Table 10 and FIG. 4. In Table 10, a belt exhibiting a starting torque at –30° C. of less than 25 cN·m was evaluated as Excellent, a belt exhibiting a starting torque of 25 cN·m or more and less than 30 cN·m was evaluated as Good, and a belt exhibiting a starting torque of 30 cN·m or more was evaluated as Bad.

TABLE 9

| | |
|---|---|
| Set tension | 75N |
| Rotation angle at measurement | 180° |

With regard to belt evaluation of the toothed belts, a toothed belt in which the evaluation on the tooth shearing force measurement test was Excellent or Good, the evaluation on the rubber hardness measurement test was Good, the evaluation on the cold-resistant endurance running test was Excellent or Good, and the evaluation on the starting torque measurement test was Excellent or Good was evaluated as Good as a toothed belt excellent in cold resistance. On the other hand, evaluated as Bad, as a toothed belt having no cold resistance, was a toothed belt which was Bad in any evaluation on the tooth shearing force measurement test, the rubber hardness measurement test, the cold-resistant endurance running test, and the starting torque measurement test mentioned above. As shown in Table 10, as a result of evaluation, the toothed belts of Examples 1 to 4 were toothed belts excellent in cold resistance and the toothed belts of Comparative Examples 1 to 4 were toothed belts having no cold resistance.

TABLE 10

| | | Example 1 | Example 2 | Example 3 | Example 4 |
|---|---|---|---|---|---|
| | Rubber formulation | Formulation 4 | Formulation 3 | Formulation 5 | Formulation 7 |
| | Cord | Cord 2 | Cord 2 | Cord 2 | Cord 2 |
| Tooth shearing force | Measured value (N) | 1150 | 1290 | 830 | 1120 |
| | Evaluation | Good | Excellent | Good | Good |
| Rubber hardness | 25° C. (°) | 75 | 79 | 70 | 75 |
| | –30° C. (°) | 77 | 82 | 71 | 77 |
| | Difference between 25° C. and –30° C. | 2 | 3 | 1 | 2 |

TABLE 10-continued

|  |  |  | Good | Good | Good | Good |
|---|---|---|---|---|---|---|
| Cold-resistant endurance running test | Evaluation Running time (h) Evaluation |  | Good 60 Excellent | Good 36 Good | Good 60 Excellent | Good 34 Good |
| Starting torque | Measured value (cN · m) | 25° C. −30° C. | 10 24 | 10 28 | 9 11 | 10 29 |
|  |  | Evaluation | Excellent | Good | Excellent | Good |
|  | Belt evaluation |  | Good | Good | Good | Good |

|  |  |  | Comparative Example 1 | Comparative Example 2 | Comparative Example 3 | Comparative Example 4 |
|---|---|---|---|---|---|---|
|  | Rubber formulation |  | Formulation 1 | Formulation 2 | Formulation 6 | Formulation 4 |
|  | Cord |  | Cord 2 | Cord 2 | Cord 2 | Cord 5 |
| Tooth shearing force | Measured value (N) Evaluation |  | 1420 Excellent | 1340 Excellent | 490 Bad | 1140 Good |
| Rubber hardness | 25° C. (°) −30° C. (°) Difference between 25° C. and −30° C. |  | 84 92 8 | 80 85 5 | 65 65 0 | 75 77 2 |
|  | Evaluation |  | Bad | Bad | Good | Good |
| Cold-resistant endurance running test | Running time (h) Evaluation |  | 3.5 Bad | 20 Bad | 60 Excellent | 27 Bad |
| Starting torque | Measured value (cN · m) | 25° C. −30° C. | 11 42 | 11 38 | 8 9 | 10 25 |
|  |  | Evaluation | Bad | Bad | Excellent | Good |
|  | Belt evaluation |  | Bad | Bad | Bad | Bad |

From the results of Table 10 and FIG. 4, the following facts were found.

In the tooth shearing force measurement test, it is found that the tooth shearing force decreases as the addition amount of the plasticizer increases. Specifically, the tooth shearing force decreases in the order of Comparative Example 1, Comparative Example 2, Example 2, Example 1, Example 3, and Comparative Example 3 in which the addition amount of the plasticizer in the formulation of the rubber composition increases in the order of the formulations 1 to 6 shown in Table 7. In the toothed belt of Comparative Example 3 in which the formulation of the rubber composition is the formulation 6 and the addition amount of the plasticizer is largest, the tooth shearing force was small and did not reach a practical level. Incidentally, even when the toothed belt of Example 1 in which the formulation of the rubber composition is the formulation 4 was compared to the toothed belt of Example 4 in which the formulation of the rubber composition is the formulation 7, a difference depending on the kind of the plasticizer was hardly observed. Even when the toothed belt of Example 1 in which the cord 2 shown in Table 6 was used as a cord was compared to the toothed belt of Comparative Example 4 in which the cord 5 shown in Table 6 was used as a cord, a difference depending on the kind of the cord was hardly observed.

In the rubber hardness measurement test, as compared to the toothed belts of Comparative Examples 1 and 2 in which the formulations of the rubber compositions are the formulations 1 and 2 shown in Table 7, the toothed belts of Examples 1 to 4 and Comparative Examples 3 and 4 of the formulations 3 to 7 are graded the evaluation of the difference in the rubber hardness between 25° C. and −30° C. as Good and thus it is found that an increase in the rubber hardness at −30° C. can be suppressed by the addition of the plasticizer. That is, in the toothed belts of Examples 1 to 4 and Comparative Examples 3 and 4 of the formulations 3 to 7 in which the plasticizer was added in an amount of 5 parts by mass or more based on 100 parts by mass of the rubber component, the difference between the rubber hardness values measured at 25° C. and −30° C. was small as 4° or less. Incidentally, even when the toothed belt of Example 1 in which the formulation of the rubber composition is the formulation 4 was compared to the toothed belt of Example 4 in which the formulation of the rubber composition is the formulation 7, a difference depending on the kind of the plasticizer was hardly observed. Even when the toothed belt of Example 1 in which the cord 2 shown in Table 6 was used as a cord was compared to the toothed belt of Comparative Example 4 in which the cord 5 shown in Table 6 was used as a cord, a difference depending on the kind of the cord was hardly observed.

Moreover, the toothed belt of Comparative Example 3 in which the addition amount of the plasticizer is largest showed the rubber hardness at 25° C. of less than 70° and thus, it is found that usable rubber hardness of the toothed belt cannot be secured at normal temperature. In the toothed belts of Examples 1 to 4 and Comparative Examples 1, 2, and 4, the rubber hardness at 25° C. falls within the range of from 70 to 85° and thus, it was confirmed that usable rubber hardness of the toothed belt at normal temperature can be secured even when the plasticizer is added.

In the cold-resistant endurance running test, no crack was generated on the belt back side of the toothed belts of Examples 1 and 3 and Comparative Example 3 in which the cord 2 was used and the adipic acid-based plasticizer was added in an amount of 10 parts by mass or more based on 100 parts by mass of the rubber component even when the 60 hours running test had been completed. Here, in the toothed belt of Example 2 in which the adipic acid-based plasticizer was added in an amount of 5 parts by mass based on 100 parts by mass of the rubber component and the toothed belt of Example 4 in which the ether ester-based plasticizer was added in an amount of 10 parts by mass based on 100 parts by mass of the rubber component, a crack was generated on the belt back side at 36 hours and 34 hours, respectively. However, since the belt has run for 30 hours or more, which is practically within an allowable range. That is, in the toothed belt of Example 4 in which the ether ester-based plasticizer was formulated into the rubber composition, such an effect as that in the cases of the toothed belts of Examples 1 to 3 and Comparative Example 3 in which the adipic acid-based plasticizer was added was not obtained, but it is found that the cold-resistant endurance running time was extended by the addition of the plasticizer. Moreover, in the toothed belt of Comparative Example 1 in which no plasticizer was added and the toothed belt of Comparative Example 2 in which the adipic acid-based plasticizer was added in an amount of 2 parts by mass based on 100 parts by mass of the rubber component, a crack was generated on the belt back side at 3.5 hours and 20 hours, respectively. In the toothed belt of Comparative Example 4, the adipic acid-based plasticizer was added in an amount of 10 parts by mass based on 100 parts by mass of the rubber component but it is supposed that the crack was generated due to the use of a plied cord as the cord. It is considered that this is because a plied cord is inferior in bending fatigue resistance as compared with a Lang-twisted cord.

In the starting torque measurement test, under the test environment of 25° C., no large difference was observed among the toothed belts of Examples 1 to 4 and the toothed belts of Comparative Examples 1 to 4. On the other hand, under the test environment of −30° C., the starting torque decreased depending on the addition amount of the plasticizer. Specifically, the starting torque decreases in the order of Comparative Example 1, Comparative Example 2, Example 2, Example 1, Example 3, and Comparative Example 3 in which the addition amount of the plasticizer in the formulations of the rubber compositions increases in the order of the formulations 1 to 6 shown in Table 7. The toothed belt of Comparative Example 1 in which no plasticizer was added and the toothed belt of Comparative Example 2 in which the adipic acid-based plasticizer was added in an amount of 2 parts by mass based on 100 parts by mass of the rubber component showed a large starting torque, which did not reach a practical level. In the toothed belt of Example 4 in which the ether ester-based plasticizer was blended into the rubber composition, such an effect as that in the case of the toothed belts of Examples 1 to 3 and Comparative Example 3 in which the adipic acid-based plasticizer was blended into the rubber composition was not obtained, but it was possible to decrease the starting torque at −30° C. to less than 30 cN·m by adding the plasticizer.

The above results are summarized. It was found that, by adding the plasticizer to the rubber composition constituting the back side, there can be formed toothed belts that are not hardened even at an extremely low temperature and have such a degree of flexibility that is not so much different from that at normal temperature. Moreover, it was found that, even if the plasticizer is added in an amount of less than 5 parts by mass based on 100 parts by mass of the rubber component, it is impossible to impart such a degree of flexibility that is not so much different from that at normal temperature to the rubber composition at an extremely low temperature. On the other hand, it was found that, in the case where the plasticizer is added in an amount of more than 20 parts by mass based on 100 parts by mass of the rubber component, the tooth shearing force of the toothed belt is low, which does not reach a practical level. Moreover, in the case of the ether ester-based plasticizer, such an effect as that in the case of the adipic acid-based plasticizer was not obtained but it was found that cold resistance (low-temperature flexibility) is improved by adding the plasticizer. It was found that, in the case of using a plied cord, a crack is generated in an early period in the cold-resistant endurance running test even if the adipic acid-based plasticizer is added.

(Consideration)

From the aforementioned tests, the followings were revealed.

From the results of Table 6, it was revealed that, in order to prevent the contact with water and improve the water resistance, the glass cord preferably has the following configuration.

The glass cord is configured by Lang twist. That is, since a Lang-twisted cord is excellent in abrasion resistance even when water infiltrates therein and the cord is swollen, the surface thereof is structurally less likely to wear and the adhesive component is less likely to separate. Therefore, as compared to a plied cord, protection of the cord relatively remains and water resistance is improved. Also from the results of the cord 4 and the cord 6 in the water-pouring running test shown in Table 6, since the tensile strength retention is improved by about 23% by changing the cord from plied one to Lang-twisted one (with no overcoat treatment), the excellent water resistance of the Lang-twisted glass cord was confirmed.

Furthermore, the adhesion treatment layer of the cord is further subjected to an overcoat treatment to form an overcoat treatment layer that is a protective layer, thereby preventing the contact with water. Also from the results of the cord 2 and the cord 4 in the water-pouring running test shown in Table 6, since the tensile strength retention is improved by about 61% by changing the cord from plied one to Lang-twisted one and further performing the overcoat treatment, the excellent water resistance resulting from the overcoat treatment was confirmed.

From the results of Table 10, it was revealed that, in order to prevent hardening, achieve such a degree of flexibility that is not so much different from that at normal temperature, and be capable of starting with a small torque, even upon standing at an extremely low temperature, the suitable configuration is as follows.

By configuring the cord by Lang twist, the bending fatigue resistance can be maintained not only at normal temperature but also at an extremely low temperature of from −20 to −30° C. Moreover, in order to control the rubber composition constituting the back side of the toothed belt to a flexible formulation which is not hardened even at an extremely low temperature, a plasticizer is added to the rubber composition. Here, the addition amount of the plasticizer is controlled to from 5 to 20 parts by mass based on 100 parts by mass of the rubber component. The plasticizer is preferably an adipic acid-based plasticizer and also, an ether ester-based plasticizer, an ether-based plasticizer, an ester-based plasticizer, a phthalic acid-based plasticizer, or the like may be used.

As a result of the tooth shearing force measurement test shown in Table 10, with regard to the toothed belts of Examples 1 to 4 having the above configuration, it is found that the tooth shearing force that is a maximum value of tensile values when one tooth of the toothed belt is stretched at a rate of 50±10 mm/min by an autograph in a state that the tooth is pressed under a certain pressure, is from 800 N to 1,500 N, and thus excellent tooth strength and tooth crack resistance were confirmed. Moreover, as a result of the rubber hardness measurement test shown in Table 10, with regard to the toothed belts of Examples 1 to 4 having the above configuration, rubber hardness of the back side rubbers of the toothed belts measured by using a type A durometer in accordance with JIS K 6253 (2012) after being left standing under an atmosphere of −30° C. for 90 minutes, is increased only by from +0° to +4° relative to the rubber hardness of the back side rubbers of the toothed belts measured after being left standing under an atmosphere of 25° C. for 90 minutes, and thus an excellent cold resistance was confirmed. Furthermore, as a result of the rubber hardness measurement test shown in Table 10, with regard to the toothed belts of Examples 1 to 4 having the above configuration, rubber hardness of the back side rubbers of the toothed belts measured by using a type A durometer in accordance with JIS K 6253 (2012) after being left standing under an atmosphere of 25° C. for 90 minutes, falls within the range of from 70° to 85°, and thus it was confirmed that usable rubber hardness of the toothed belt at normal temperature can be secured. In addition, as a result of the cold-resistant endurance running test shown in Table 10, with regard to the toothed belts of Examples 1 to 4 having the above configuration, the running time is 30 hours or more when each toothed belt after being left standing under an atmosphere of −30° C. for 15 hours in a state that the belt was wound on pulleys of a two-axis layout was allowed to run until crack generation, and thus an excellent cold resistance was confirmed. Furthermore, as a result of the starting torque measurement test shown in Table 10, with regard to the toothed belts of Examples 1 to 4 having the above configuration, for each toothed belt after being left standing under an atmosphere of −30° C. for 90 minutes in a state that the toothed belt was wound on pulleys of a two-axis layout, starting torque necessary for starting by rotating the pulleys by 180° is less than 30 cN·m, and thus an excellent cold resistance was confirmed.

From the above, it was revealed that the toothed belt prepared by subjecting a Lang-twisted glass cord to an adhesion treatment to form an adhesion treatment layer, subsequently further performing an overcoat treatment thereon to form an overcoat treatment layer, and adding a plasticizer to the rubber composition constituting the back side in an amount of from 5 to 20 parts by mass based on 100 parts by mass of the rubber component is excellent in water resistance and cold resistance while bending fatigue resistance is secured.

Embodiments of the present invention have been described above based on the drawings but specific configurations should not be construed as being limited to these embodiments and examples. The scope of the present invention is shown by not only the description of the embodiments and Examples mentioned above but also Claims, and all changes within meanings and scopes equivalent to Claims are included therein.

The present application is based on Japanese Patent Application No. 2014-093930 filed on Apr. 30, 2014 and Japanese Patent Application No. 2015-083109 filed on Apr. 15, 2015, and the contents thereof are incorporated herein by reference.

INDUSTRIAL APPLICABILITY

By utilizing the present invention, it is possible to obtain a toothed belt excellent in water resistance and cold resistance while bending fatigue resistance is secured.

DESCRIPTION OF REFERENCE NUMERALS AND SIGNS

1: Toothed belt
2: Tooth part
3: Cord
4: Back side

The invention claimed is:

1. A toothed belt comprising tooth parts that are disposed at predetermined intervals along a belt longitudinal direction, a cord, and a back side that has the cord embedded therein,
   wherein the cord comprises a Lang-twisted glass fiber, an adhesion treatment layer, and an overcoat treatment layer, and the overcoat treatment layer is formed on a surface of the adhesion treatment layer, and
   the back side is composed of a rubber composition, and the rubber composition comprises from 5 parts by mass to 20 parts by mass of a plasticizer based on 100 parts by mass of a rubber components,
   wherein the plasticizer comprises at least one selected from the group consisting of ether-based, ester-based, ether ester-based, phthalic acid-based, and adipic acid-based ones.

2. The toothed belt according to claim 1, wherein the rubber composition constituting the back side has a rubber hardness rating, measured at 25° C., in a range of 70° to 85°.

3. The toothed belt according to any one of claim 1, wherein the rubber composition constituting the back side has a rubber hardness rating, at −30° C., in a range of +0° to +4° relative to the rubber hardness rating measured at 25° C.

4. The toothed belt according to any one of claim 1, wherein a starting torque of the toothed belt at −30° C. is less than 30 cN·m.

5. The toothed belt according to any one of claims 1, wherein the rubber composition constituting the back side comprises at least chloroprene rubber.

6. The toothed belt according to any one of claims 1, wherein the tooth parts are composed of a rubber composition and the rubber composition comprises at least chloroprene rubber.

7. The toothed belt according to any one of claims 1, wherein the glass fiber is alkali-free glass.

* * * * *